United States Patent [19]

White, Jr.

[11] 4,186,823
[45] Feb. 5, 1980

[54] WHEEL WEDGE
[75] Inventor: Jack D. White, Jr., Springfield, Mo.
[73] Assignee: Dayco Corporation, Dayton, Ohio
[21] Appl. No.: 946,673
[22] Filed: Sep. 28, 1978
[51] Int. Cl.² .............................................. B60T 3/00
[52] U.S. Cl. .................................................... 188/32
[58] Field of Search ...................... 188/32, 4 R, 31, 36

[56] References Cited
U.S. PATENT DOCUMENTS

| | | | |
|---|---|---|---|
| 1,861,549 | 6/1932 | Ratta | 188/32 |
| 1,893,580 | 1/1933 | Colley | 188/32 |
| 2,797,774 | 7/1957 | Eckhart | 188/32 |
| 2,862,579 | 12/1958 | Jicha et al. | 188/32 |

*Primary Examiner*—Douglas C. Butler
*Attorney, Agent, or Firm*—Charles E. Bricker

[57] ABSTRACT

A wheel wedge 10 is provided which comprises a wheel contacting surface 20, a first ground-contacting surface 11 and a second ground-contacting surface 15. The first surface 11 comprises a plurality of transversely extending ribs 13 and the second surface 15 comprises a plurality of cylindrical members 16, such as tire studs, embedded therein.

7 Claims, 4 Drawing Figures

WHEEL WEDGE

This invention relates to tire wedges of the type adapted to resist forward motion of a wheel along a planar surface.

Wheel wedges, otherwise known as wheel chocks, are used whenever it is desired to prevent passenger cars, trucks or other wheeled vehicles from rolling along a roadway, runway or other surface. Typical wheel wedges are disclosed in U.S. Pat. Nos. 1,893,580 and 2,797,774.

It is necessary that wheel wedges have wheel and ground contacting surfaces that have good gripping qualities. To this end the wheel-contacting surface may be concave and the ground-contacting surface may be rubber, as disclosed in U.S. Pat. No. 1,893,580, which provides high frictional resistance to motion, or the ground-contacting surface may be provided with spaced transverse cleats or ribs formed between a plurality of transverse grooves, as disclosed in U.S. Pat. No. 2,797,774. These cleats have downwardly converging faces so that a downward force exerted on the wedge will tend to force the cleats into the ground or other wheel supporting surface thereby locking the wedge and the wheel in a fixed position.

While the above-described wheel wedges possess certain desirable properties, they are virtually useless on an icy surface.

It is therefore an object of this invention to provide a wheel wedge which can be used under all weather conditions.

Other objects, aspects and advantages of the present invention will be apparent to those skilled in the art from the following description, the appended claims and the attached drawing.

In accordance with the present invention there is provided a wheel wedge made primarily of an elastomeric material having a wheel-contacting surface, a first ground-contacting surface comprising a plurality of transversely extending ribs and a second ground-contacting surface comprising a plurality of spaced, generally cylindrical members at least partially embedded in the elastomeric material and having a portion of one end section thereof exposed at the face of the second surface.

Figure 1:
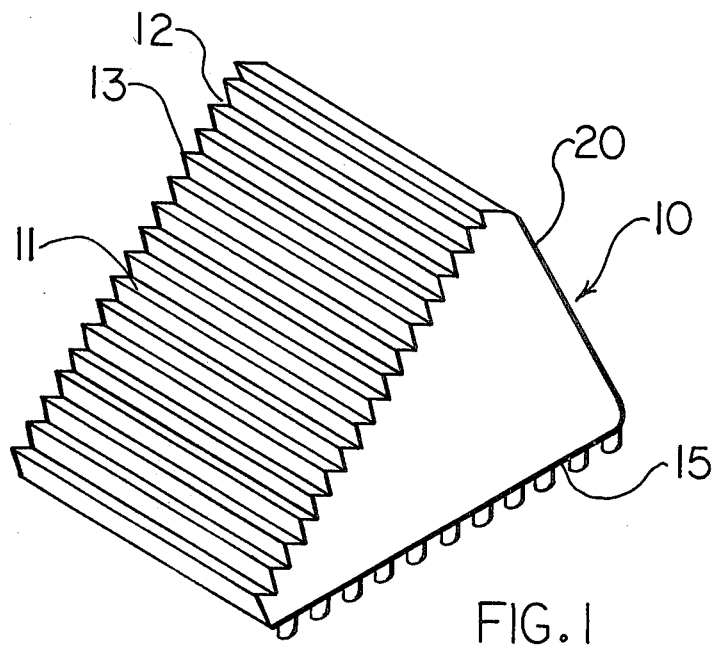
FIG. 1 is a perspective view of a typical wheel wedge of this invention.

As shown in FIG. 1, a typical wheel wedge 10 of this invention comprises a first ground-contacting surface 11 which is provided with a plurality of longitudinally spaced lateral grooves 12 forming laterally disposed ribs 13 which may or may not extend entirely across the surface 11. The ribs 13 may be formed by triangular grooves 12 as shown in FIG. 1, or by semi-circular grooves such as 14 in FIG. 2. The purpose of the ribs is to provide for a firm engagement of the ground contacting surface 11 with irregular wheel supporting surfaces such as are encountered on highways, shoulders, dirt roads and the like. Where the wheel supporting surface is soft, these ribs will act as cleats by sinking into such surface thereby maintaining the fixed position of the wedge relative to the surface on which it rests. Where the wheel supporting surface is hard, these ribs, being resilient, will deform, thus creating a whipping action which will resist any movement of the wedge relative to the supporting surface.

Figure 4:
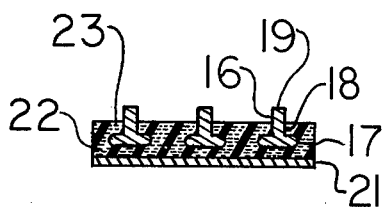
FIG. 4 is a cross-section taken on line 4—4 of FIG. 2.

The second ground-contacting surface 15 of the wedge 10 comprises a plurality of generally cylindrical members 16 embedded at least partially in the body of the wedge 10 and having at least a portion of one end section thereof exposed at the face of the surface 15. The members 16 may have a simple cylindrical form, but preferably have anchoring means in association therewith. For example, and as shown in FIG. 4, the members 16 may be tire studs which have an anchoring portion 17 at one end thereof which extends radially outwardly from the shank 18 of the member 16. The opposite end 19 of the member 16 is generally a very hard material, such as hardened steel, a carbide material or a ceramic material. The purpose of the members 16 is to provide for a firm engagement of the ground-contacting surface 15 under icy conditions, as where there is at least a layer of glaze ice on the wheel supporting surface.

Figure 2:
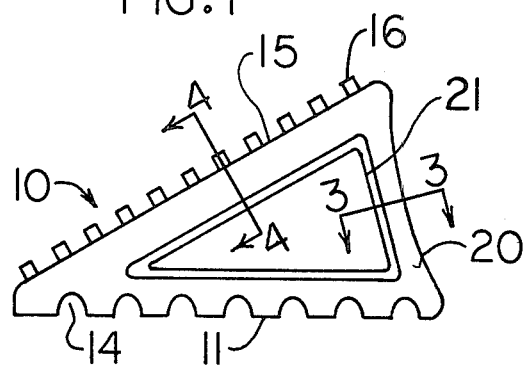
FIG. 2 is a side view of an alternative wheel wedge according to this invention, the same being shown in an inverted position.
Figure 3:
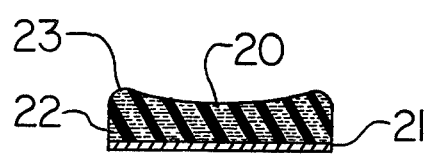
FIG. 3 is a cross-section taken on line 3—3 of FIG. 2.

The wheel-contacting surface of the wedge 10 is the surface 20 which extends between the two ground-contacting surfaces 11 and 15. The surface 20, may be flat, as shown in FIG. 1, or concave vertically as shown in FIG. 2, to conform to the wheel being blocked. The surface 20 may also be concave laterally, as shown in FIG. 3, so as to embrace a wheel more completely. The wedge 10 is preferably concave in both directions.

The wheel wedge 10 may be solid, as shown in FIG. 1, or it may be hollow, as shown in FIG. 2, with a hollow triangular frame 21 located within the elastomeric block and united thereto by vulcanization. The frame 21 strengthens the wedge 10 and limits the distortion of the elastomeric material. It also provides a passage through the wedge 10 to lighten its weight.

Referring now to FIG. 4, the material used in the manufacture of the wedge 10 is an elastomeric material 22, such as rubber, or rubber-like material which preferably has a plurality of small textile fibers 23 dispersed therethrough. Depending upon the characteristics of the elastomeric material employed, from about 10 to 100 parts by weight of natural or synthetic fiber per 100 parts by weight of elastomeric material may be used to provide a desired material hardness.

The wedge of this invention may be manufactured according to a variety of molding techniques. Although the members 15 may be inserted into molding recesses after the wedge 10 is formed, it is presently preferred to mold these members directly into the wedge 10.

Various modifications of the invention will be apparent to those skilled in the art.

I claim:

1. A wheel wedge made primarily of an elastomeric material and having a wheel-contacting surface, a first ground-contacting surface comprising a plurality of transversely extending ribs and a second ground-contacting surface comprising a plurality of spaced, generally cylindrical members at least partially embedded in said elastomeric material and having at least a portion of one end section thereof exposed at the face of said second surface, wherein said members have an anchoring portion at one end thereof which extends radially outwardly from the shank of said member, said anchoring portion being completely embedded in said elastomeric material.

2. The wheel wedge of claim 1 wherein said elastomeric material has a plurality of fibers dispersed therethrough.

3. The wheel wedge of claim 2 wherein the amount of said fibers is in the approximate range of 10 to 100 parts by weight per 100 parts by weight of said elastomeric material.

4. The wheel wedge of claim 1 wherein said members are ceramic.

5. The wheel wedge of claim 1 wherein said members are metal.

6. The wheel wedge of claim 5 wherein said metal members have a carbide end portion.

7. The wheel wedge of claim 1 wherein said wedge is hollow with a hollow triangular frame located within said elastomeric material and united thereto by vulcanization.

* * * * *